United States Patent [19]

Seed et al.

[11] 4,198,271
[45] Apr. 15, 1980

[54] LIQUID METAL COOLED NUCLEAR REACTOR CONSTRUCTIONS

[75] Inventors: Geoffrey Seed, St. Helens; Donald Hodgson, Ormskirk; Colin J. Grime, Warrington, all of England

[73] Assignee: United Kingdom Atomic Energy Authority, London, England

[21] Appl. No.: 824,228

[22] Filed: Aug. 12, 1977

[30] Foreign Application Priority Data

Aug. 12, 1976 [GB] United Kingdom ............... 33674/76

[51] Int. Cl.² .............................................. G21C 9/00
[52] U.S. Cl. .......................................... 176/38; 176/40
[58] Field of Search ....................... 176/37, 38, 60, 87, 176/40

[56] References Cited

U.S. PATENT DOCUMENTS

| | | | |
|---|---|---|---|
| 3,888,730 | 6/1975 | Jackson | 176/38 |
| 4,028,178 | 6/1977 | Jullien et al. | 176/38 |
| 4,076,585 | 2/1978 | Cachera | 176/38 |
| 4,115,194 | 9/1978 | Butti | 176/87 |

FOREIGN PATENT DOCUMENTS

| | | | |
|---|---|---|---|
| 1948522 | 1/1971 | Fed. Rep. of Germany | 176/38 |
| 2736252 | 2/1978 | Fed. Rep. of Germany | 176/38 |
| 1352950 | 1/1964 | France | 176/60 |

Primary Examiner—Samuel W. Engle
Assistant Examiner—S. A. Cangialosi
Attorney, Agent, or Firm—Larson, Taylor and Hinds

[57] ABSTRACT

The reactor core is carried from the base region of the primary vessel by a strongback. An annular foot is attached to the inside surface of the leak jacket leaving a clearance of 6 mm between the foot and the outer surface of the base region of the primary vessel. In the event of deflection of the primary vessel, downward displacement of the core relative to the control rods is limited thereby avoiding serious reactivity instability.

4 Claims, 1 Drawing Figure

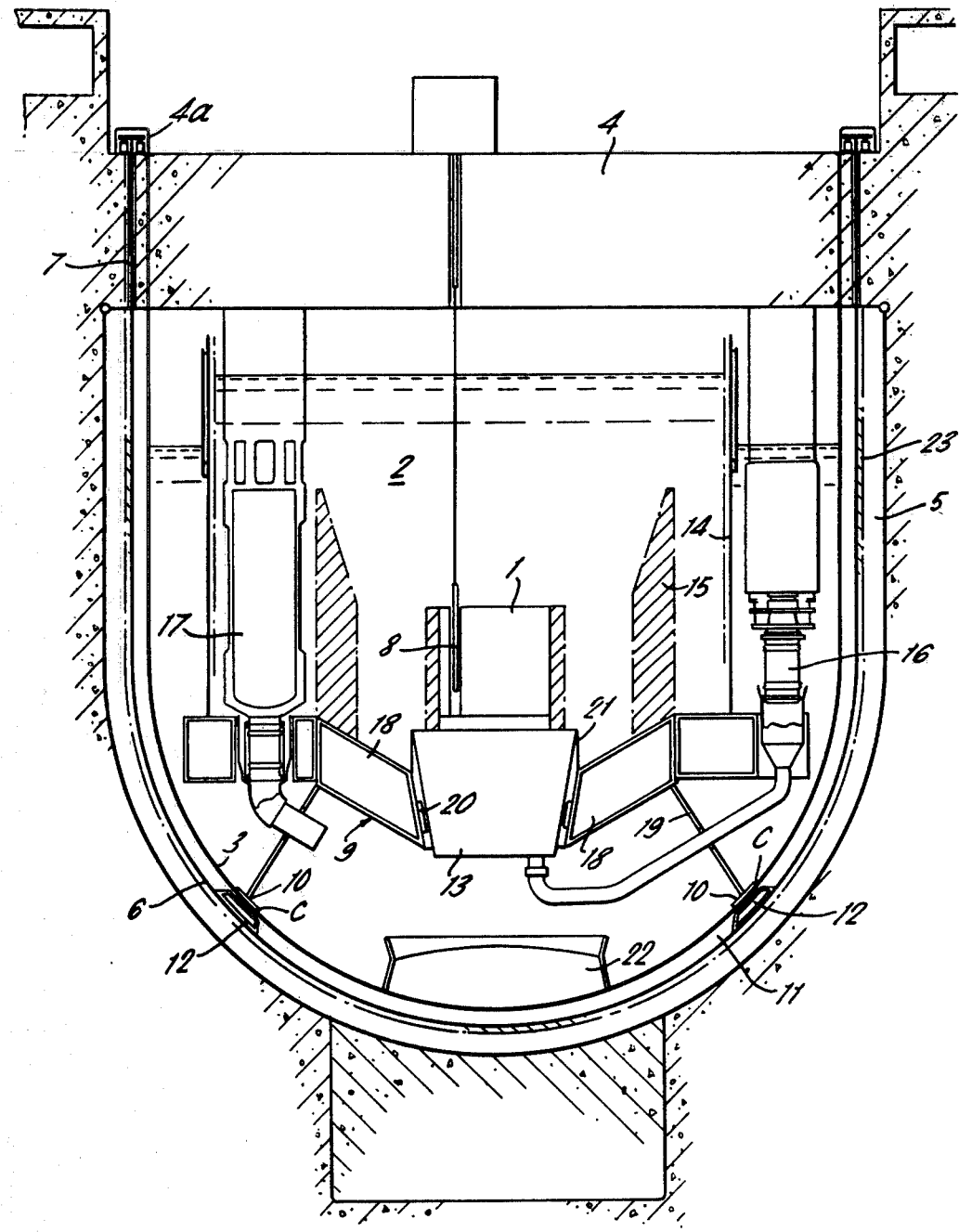

ns.#

LIQUID METAL COOLED NUCLEAR REACTOR CONSTRUCTIONS

BACKGROUND OF THE INVENTION

This invention relates to liquid metal cooled nuclear reactor constructions.

In one well known example of liquid metal cooled nuclear reactor construction the reactor is submerged in a pool of coolant contained in a primary vessel. The primary vessel is housed in a concrete containment vault and is suspended from the roof of the vault. There is a leak jacket or catchpot surrounding the primary vessel for catching coolant in the event of leakage. The core is carried on a diagrid which depends from the roof of the vault by tie rods and the roof carries control rods which are vertically insertable in the core to control reactivity. In the event of displacement of the core relative to the control rods during operation of the reactor core the resultant change of reactivity could have serious consequences and it is an object of the present invention to provide a construction of liquid metal cooled nuclear reactor having means for limiting uncontrolled displacement of the core relative to the control rods.

SUMMARY OF THE INVENTION

According to the invention in a liquid metal cooled nuclear reactor construction wherein the reactor core is submerged in a pool of coolant in a primary vessel, the primary vessel being suspended from the roof structure of a containment vault and surrounded by a leak jacket, there being control rods supported from the roof structure and insertable in the core, the reactor core is supported from the wall of the base region of the primary vessel and there is secondary core support means, non-loaded during normal operation of the reactor said means being located in an interspace between the primary vessel and the leak jacket for limiting the extend of downward deflection of the base region of the primary vessel. Thus in the event of deflection of the wall of the primary vessel such as would allow downward displacement of the reactor core relative to the control rods, the leak jacket provides secondary support means for the core and limits its displacement.

DESCRIPTION OF THE DRAWINGS

A constructional example of liquid metal cooled nuclear reactor embodying the invention is described, by way of example, with reference to the sole accompanying drawing which is a diagrammatic sectional view.

DESCRIPTION OF THE PREFERRED EMBODIMENT

In the construction shown in the drawing the reactor core 1 is submerged in a pool 2 of liquid sodium in a primary vessel 3. The primary vessel is suspended from the roof structure 4 of a containment vault 5 the rim of the primary vessel being sealed to the roof structure in order to contain an inert cover gas for the pool of coolant. There is a leak jacket 6 suspended from jacking means 4a of the roof structure by tie members 7 and it surrounds the primary vessel in order to catch any liquid metal coolant which may leak from the primary vessel. A plurality of control rods 8 (only one being shown in the drawing) is supported by the roof structure of the vault and the rods are insertable in the core to control reactivity. The reactor core is supported from the wall of the base region of the primary vessel by means of a strongback 9 diagrid 13 combination, the strongback 9 having an annular foot 10 which is secured to the primary vessel. Within the interspace designated 11 between the primary vessel 3 and the leak jacket 6 there is an annular shoe 12 disposed immediately below the foot 10 and there is a clearance designated 'C' between the shoe 12 and the external surface of the primary vessel. The clearance 'C' is adjustable by the jacking means 4a. In the event of deflection of the wall of the primary vessel downward displacement of the core relative to the control rods is limited to the clearance 'C' and thereby avoids serious reactivity instability. In more detail, the nuclear reactor core 1 is a fast breeder reactor comprising a plurality of upstanding fuel element assemblies arranged side-by-side on the diagrid which serves as a coolant inlet plenum for the core. The core is surrounded by a shroud 14 or core tank and there is an intermediate annular neutron shield 15. Four pumps 16 and four heat exchangers 17 (only one of each being shown in the drawing) depend from the roof of the vault and are immersed in the pool of coolant. The pumps are arranged to deliver coolant drawn from the outer regions of the pool to the core by way of the diagrid 13. The coolant is heated in passage through the core and flows upwardly through the shroud 14 thence outwardly to the heat exchangers 17 subsequently being returned to the pool. The strongback has four arms 18 mounted on an annular skirt 19 which carries the foot 10. The diagrid 13 is of frustroconical shape and sits within a complementary socket defined by the strongback the socket having an annular shoe 20. The diagrid 13 is carried from the strongback by an annular skirt 21 such that there is a clearance between the shoe 20 and the diagrid 13. The skirt 21 and strongback 9 are imperforate to prevent downward flow of coolant from inside the shroud and the strongback is of double skin construction. The primary vessel houses a tray 22 for the collection of core debris and the primary vessel is externally clad with thermal insulation 23 to reduce heat transfer to the concrete vault structure 5.

In the event of failure of the support skirt 21 for the core, displacement of the core is limited to the clearance between the diagrid 13 and the shoe 20. Instrumentation (not shown in the drawing) is provided for monitoring the clearances between the shoe 20 and the diagrid 13 and between the shoe 12 and the primary vessel 3. In the described construction both clearances are 6 mm.

We claim:

1. In a liquid metal cooled nuclear reactor construction comprising
    a primary vessel housed with a concrete containment vault, the primary vessel being suspended from the roof structure of the containment vault,
    a reactor core submerged in a pool of coolant in the primary vessel, the reactor core being supported from the wall of the base region of the primary vessel,
    a leak jacket spaced from and surrounding the primary vessel,
    control rods supported from the roof structure of the vault and insertable in the core, the improvement comprising secondary core support means, non-loaded during normal operation of the reactor said means being located in the interspace between the primary vessel and the leak jacket for limiting the extent of downward deflection of the base region of the primary vessel.

2. A liquid metal cooled nuclear reactor construction according to claim 1 wherein said means for limiting the extend of downward deflection of the base region of the primary vessel comprises an abutment member attached to the leak jacket in manner providing a clearance between the member and the primary vessel.

3. A liquid metal cooled nuclear reactor construction according to claim 2 wherein the leak jacket is suspended from jacking means of the roof structure by tie members, and the clearance between the abutment member and the primary vessel is adjustable by the jacking means.

4. A liquid metal cooled nuclear reactor construction according to claim 3 wherein the reactor core is supported from the wall of the base region of the primary vessel by means of a strongback and diagrid, combination which has means for limiting downward displacement of the diagrid relative to the strongback.

* * * * *

UNITED STATES PATENT AND TRADEMARK OFFICE
CERTIFICATE OF CORRECTION

PATENT NO. : 4198271
DATED : April 15, 1980
INVENTOR(S) : SEED ET AL

It is certified that error appears in the above-identified patent and that said Letters Patent are hereby corrected as shown below:

Please change the name of the assignee from "United Kingdom Atomic Energy Authority" to -- Nuclear Power Company Limited --.

Signed and Sealed this

Fifth Day of August 1980

[SEAL]

Attest:

SIDNEY A. DIAMOND

Attesting Officer

Commissioner of Patents and Trademarks